United States Patent
Polywoda, III

(10) Patent No.: US 8,413,493 B1
(45) Date of Patent: Apr. 9, 2013

(54) METHOD FOR DETECTING A DEFECT ON AN OPERATING TURBINE ROTOR BLADE

(75) Inventor: John A Polywoda, III, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 13/316,939

(22) Filed: Dec. 12, 2011

(51) Int. Cl.
  *G01M 15/14* (2006.01)
(52) U.S. Cl. .................................... 73/112.01
(58) Field of Classification Search ............... 73/112.01
  See application file for complete search history.

(56) References Cited

U.S. PATENT DOCUMENTS

| | | | |
|---|---|---|---|
| 5,226,731 A | 7/1993 | Allen | |
| 6,109,783 A | 8/2000 | Dobler et al. | |
| 6,796,709 B2 | 9/2004 | Choi | |
| 7,298,818 B2 * | 11/2007 | Subramanian et al. | 378/58 |
| 7,376,518 B2 * | 5/2008 | Subramanian et al. | 702/27 |
| 7,432,505 B2 | 10/2008 | Brummel | |
| 8,063,372 B2 * | 11/2011 | Lemieux et al. | 250/339.04 |
| 2004/0101023 A1 * | 5/2004 | Choi | 374/141 |

OTHER PUBLICATIONS

Toshifumi Honda, Shree K. Nayar, Finding "Anomalies" in an Arbitrary Image, IEEE, 2001, 0-7695-1143-0/01, pp. 516-523.

* cited by examiner

*Primary Examiner* — Freddie Kirkland, III
(74) *Attorney, Agent, or Firm* — John Ryznic

(57) ABSTRACT

A method for identifying a defect such as a crack on a turbine rotor blade while the blade is in operation within a gas turbine engine, the method includes scanning the blade using an IR camera, identifying a leading edge or other line on the blade for a reference point, identifying a potential defect candidate on the blade by comparing the potential defect to a surrounding neighborhood in order to determine if the potential defect is an anomaly, and if the potential defect is an anomaly determine the structure of the anomaly in order to determine if the defect is a crack or a hole or a TBC spallation. The method computes a probability density for sub-regions in an image of the blade, conditioned upon the areas surrounding the sub-regions.

12 Claims, 3 Drawing Sheets

METHOD FOR DETECTING A DEFECT ON AN OPERATING TURBINE ROTOR BLADE

GOVERNMENT LICENSE RIGHTS

This invention was made with Government support under contract number FA9300-11-C-0005 awarded by US Air Force. The Government has certain rights in the invention.

CROSS-REFERENCE TO RELATED APPLICATIONS

None.

BACKGROUND OF THE INVENTION

1. Field of the Invention

The present invention relates generally to an industrial gas turbine engine, and more specifically to a method for detecting a crack or other defect on a turbine rotor blade during operation of the engine.

2. Description of the Related Art Including Information Disclosed Under 37 CFR 1.97 and 1.98

A gas turbine engine, such as an industrial gas turbine engine, includes a turbine section with one or more stages or rows of turbine rotator blades that are exposed to a hot gas stream passing through the turbine. In order to allow for high turbine inlet temperatures, the turbine airfoils—which include stator vanes and rotor blades—are cooled by passing cooling air through the airfoils to limit a metal temperature. The turbine airfoils also include a TBC or thermal barrier coating to provide additional protection to the airfoil surfaces from the hot gas stream.

For an industrial gas turbine engine, part life is a main design concern due to the fact that an industrial engine must be capable of operating for very long periods of time without shutting down the engine as opposed to an aero engine which operates only during flight. A part such as a turbine rotor blade is exposed to high temperatures that will cause erosion or other damage if the part is not properly protected from the high temperature exposure. Turbine blades rotate at around 3,600 rpm and thus are under high stress loading. In a turbine rotor blade, the airfoil leading and trailing edges and the transition between the airfoil and a platform are areas that are under high thermal loads and thus a high probability of stress loads. These sections of the blade are the most likely locations for crack development.

Turbine airfoils like rotor blades are also subject to damage such as holes being formed or spallation of the TBC which will subject the external airfoil surface to direct exposure to the hot gas stream.

Several references are known in which an IR or infra-red camera is used to monitor a condition of a turbine rotor blade while in operation in the engine. U.S. Pat. No. 7,298,818 issued to Subramaniam et al. on Nov. 20, 2007 entitled METHOFOLOGIES FOR NON-DESTRUCTIVE QUANTIFICATION OF THERMAL BARRIER COATING TEMPERATURE ON SERVICE RUN PARTS discloses Methodologies for non-destructively inspecting and characterizing micro-structural features in a thermal barrier coating (TBC) on a component, wherein the micro-structural features define pores and cracks, if any, in the TBC. The micro-structural features having characteristics at least in part based on a type of process used for developing the TBC and affected by operational thermal loads to which a TBC is exposed. In one embodiment, the method allows detecting micro-structural features in a TBC, wherein the detecting of the micro-structural features is based on energy transmitted through the TBC, such as may be performed with a micro-feature detection system. The transmitted energy is processed to generate data representative of the micro-structural features, such as may be generated by a controller. The data representative of the micro-structural features is processed (e.g., by a processor) to determine at least one of the following: volumetric porosity information for the TBC and variation in the characteristics of the micro-structural features over a thickness of the TBC. Based on the results of the data processing, information is generated regarding at least one of the following: a present condition of the thermal barrier coating and a future likely condition of the thermal barrier coating. In another embodiment, one can estimate a level of thermal load to which the thermal barrier coating has been exposed.

U.S. Pat. No. 7,376,518 issued to Subramanian et al. on May 20, 2008 and entitled SYSTEM AND COMPUTER PROGRAM PRODUCT FOR NON-DESTRUCTIVE QUANTIFICATION OF THERMAL BARRIER COATING TEMPERATURES ON SERVICE RUN PARTS discloses a System and computer program product for non-destructively inspecting and characterizing micro-structural features in a thermal barrier coating (TBC) on a component, wherein the micro-structural features define pores and cracks, if any, in the TBC. The micro-structural features having characteristics at least in part based on a type of process used for developing the TBC and affected by operational thermal loads to which a TBC is exposed. In one embodiment, the method allows detecting micro-structural features in a TBC, wherein the detecting of the micro-structural features is based on energy transmitted through the TBC, such as may be performed with a micro-feature detection system 20. The transmitted energy is processed to generate data representative of the micro-structural features, such as may be generated by a controller 26. The data representative of the micro-structural features is processed (e.g., by a processor 30) to determine at least one of the following: volumetric porosity information for the TBC and variation in the characteristics of the micro-structural features over a thickness of the TBC. Based on the results of the data processing, information is generated regarding at least one of the following: a present condition of the thermal barrier coating and a future likely condition of the thermal barrier coating. In another embodiment, one can estimate a level of thermal load to which the thermal barrier coating has been exposed.

U.S. Pat. No. 7,432,505 issued to Brummel on Oct. 7, 2008 and entitled INFRARED-BASED METHOD discloses an online method, system, and computer-readable code for remotely monitoring radiant energy emitted from a turbine blade, which may be undergoing an incipient degradation, such as a crack, in a relatively low-temperature, and saturated steam environment of the low pressure stage of a steam turbine. The method and system provide sufficient temporal and spatial resolution to obtain high quality infrared images of the blade areas of interest enabling the system to identify the crack at any of those areas of the blade prior to such a crack growing to a critical length.

U.S. Pat. No. 8,063,372 issued to Lemieux et al. on Nov. 22, 2011 and entitled APPARATUS AND METHOD FOR TEMPERATURE MAPPING A ROTATING TURBINE COMPONENT IN A HIGH TEMPERATURE COMBUSTION ENVIRONMENT discloses an apparatus and method for temperature mapping a rotating component in a high temperature combustion environment. The apparatus includes a thermal imager having a field of view to sense infrared (IR) emissions. Emissivity of a surface of the component is subject to variation in the combustion environment.

A radiance emitter defines a spot within the field of view of the thermal imager. The spot indicates a respective emissivity value. A processor is connected to the thermal imager to generate a radiance map of the component based on the IR emissions from the component. The processor includes a thermal calibration module configured to calibrate the radiance map based on the emissivity value of the spot within the field of view of the thermal imager to generate a calibrated thermal map of the component that displays absolute temperature over the surface of the component.

BRIEF SUMMARY OF THE INVENTION

A process for detecting a defect such as a crack on a rotating turbine blade during operation of the blade in a gas turbine engine. The process images a specific blade using an IR camera and scans the blade for an anomaly that could be a defect such as a crack. The process uses an algorithm that scans a section of the blade for an anomaly and compares any anomaly with a surrounding neighborhood in order to determine if a true anomaly is discovered. The process then determines the structure or shape of the anomaly in order to determine if the defect is a crack or a hole or a TBC spallation.

The process first scans the blade to identify the leading edge of the blade in order to establish a reference point for further scans of the blade. A statistical filtering process such as the Canny process is used to locate lines such as the leading edge or a transition from the airfoil to the platform of a blade.

When an anomaly is identified, the location of the anomaly is determined with reference to the earlier identified leading edge or platform intersection.

DETAILED DESCRIPTION OF THE INVENTION

Figure 1:
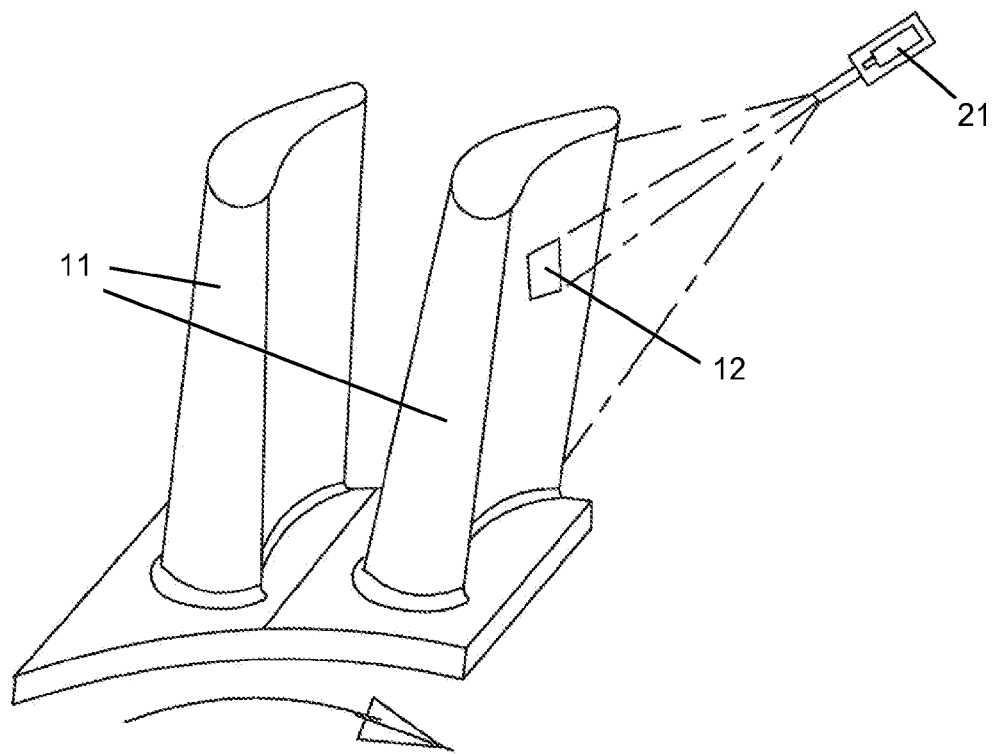
FIG. 1 shows a section of a turbine with rotor blades being imaged by an IR camera using the process of the present invention.

The present invention is a method of detecting for a defect such as a crack on a turbine rotor blade while operating within a turbine of an industrial gas turbine engine. The method uses an IR camera 21 that is capable of viewing a section of a rotating turbine blade 11 during operating of the engine. The method uses a multiple stage algorithm (statistical filtering and the Canny edge detector) to detect for a leading edge of the rotating turbine blade 11 and the edges that form the defect. Once the leading edge is detected; the method then images a section of the turbine blade either along the leading edge or away from the leading edge for anomalies that would appear from a defect on the blade surface such as a crack, a hole or a spallation of the TBC.

The Canny edge detector operator was developed by John F. Canny in 1986 and uses a multi-stage algorithm to detect a wide range of edges in images. Most importantly, Canny also produced a computational theory of edge detection explaining why the technique works. Canny's aim was to discover the optimal edge detection algorithm. In this situation, an "optimal" edge detector means: good detection—the algorithm should mark as many real edges in the image as possible: good localization—edges marked should be as close as possible to the edge in the real image: minimal response—a given edge in the image should only be marked once, and where possible, image noise should not create false edges. To satisfy these requirements Canny used the calculus of variations—a technique which finds the function which optimizes a given functional. The optimal function in Canny's detector is described by the sum of four exponential terms, but can be approximated by the first derivative of a Gaussian.

The Canny edge detector uses a filter based on the first derivative of a Gaussian, because it is susceptible to noise present on raw unprocessed image data, so to begin with, the raw image is convolved with a Gaussian filter. The result is a slightly blurred version of the original which is not affected by a single noisy pixel to any significant degree.

An edge in an image may point in a variety of directions, so the Canny algorithm uses four filters to detect horizontal, vertical and diagonal edges in the blurred image. The edge detection operator (Roberts, Prewitt, Sobel for example) returns a value for the first derivative in the horizontal direction (Gy) and the vertical direction (Gx). The edge direction angle is rounded to one of four angles representing vertical, horizontal and the two diagonals (0, 45, 90 and 135 degrees for example).

Given estimates of the image gradients, a search is then carried out to determine if the gradient magnitude assumes a local maximum in the gradient direction. So, for example, if the rounded gradient angle is zero degrees (i.e. the edge is in the north-south direction) the point will be considered to be on the edge if its gradient magnitude is greater than the magnitudes in the west and east directions. If the rounded gradient angle is 90 degrees (i.e. the edge is in the east-west direction) the point will be considered to be on the edge if its gradient magnitude is greater than the magnitudes in the north and south directions. If the rounded gradient angle is 135 degrees (i.e. the edge is in the north east-south west direction) the point will be considered to be on the edge if its gradient magnitude is greater than the magnitudes in the north-west and south-east directions. If the rounded gradient angle is 45 degrees (i.e. the edge is in the north west-south east direction) the point will be considered to be on the edge if its gradient magnitude is greater than the magnitudes in the north east and south west directions. From this stage referred to as non-maximum suppression, a set of edge points, in the form of a binary image, is obtained. These are sometimes referred to as "thin edges".

Large intensity gradients are more likely to correspond to edges than small intensity gradients. It is in most cases impossible to specify a threshold at which a given intensity gradient switches from corresponding to an edge into not doing so. Therefore Canny uses thresholding with hysteresis. Thresholding with hysteresis requires two thresholds—high and low. Making the assumption that important edges should be along continuous curves in the image allows us to follow a faint section of a given line and to discard a few noisy pixels that do not constitute a line but have produced large gradients. Therefore we begin by applying a high threshold. This marks out the edges we can be fairly sure are genuine. Starting from these, using the directional information derived earlier, edges can be traced through the image. While tracing an edge, we apply the lower threshold, allowing us to trace faint sections of edges as long as we find a starting point. Once this process is complete we have a binary image where each pixel is marked as either an edge pixel or a non-edge pixel. From complementary output from the edge tracing step, the binary edge map obtained in this way can also be treated as a set of edge curves, which after further processing can be represented as polygons in the image domain.

The Canny algorithm contains a number of adjustable parameters, which can affect the computation time and effectiveness of the algorithm. The size of the Gaussian filter: the smoothing filter used in the first stage directly affects the results of the Canny algorithm. Smaller filters cause less blurring, and allow detection of small, sharp lines. A larger filter causes more blurring, smearing out the value of a given pixel over a larger area of the image. Larger blurring radii are more useful for detecting larger, smoother edges—for instance, the edge of a rainbow. Thresholds: the use of two thresholds with hysteresis allows more flexibility than in a single-threshold approach, but general problems of thresholding approaches still apply. A threshold set too high can miss important information. On the other hand, a threshold set too low will falsely identify irrelevant information (such as noise) as important. It is difficult to give a generic threshold that works well on all images. No tried and tested approach to this problem yet exists.

The Canny algorithm is adaptable to various environments. Its parameters allow it to be tailored to recognition of edges of differing characteristics depending on the particular requirements of a given implementation. In Canny's original paper, the derivation of the optimal filter led to a Finite Impulse Response filter, which can be slow to compute in the spatial domain if the amount of smoothing required is important (the filter will have a large spatial support in that case). For this reason, it is often suggested to use Rachid Deriche's infinite impulse response form of Canny's filter (the Canny-Deriche detector), which is recursive, and which can be computed in a short, fixed amount of time for any desired amount of smoothing. The second form is suitable for real time implementations in FPGAs or DSPs, or very fast embedded PCs. In this context, however, the regular recursive implementation of the Canny operator does not give a good approximation of rotational symmetry and therefore gives a bias towards horizontal and vertical edges.

In the paper entitled Finding Anomalies in an Arbitrary Image (0-7695-1143-0/01, IEEE 2001), the Arthurs Toshifumi Honda and Shree K. Nayar disclose a fast and general method to extract anomalies in an arbitrary image. This paper is incorporated herein by reference in its entirety. The basic idea is to compute a probability density for sub-regions in an image, conditioned upon the areas surrounding the sub-regions. Linear estimation and Independent Component Analysis (ICA) are combined to obtain the probability estimates. Pseudo non-parametric correlation is used to group sets of similar surrounding patterns, from which a probability for the occurrence of a given sub-region is derived. A carefully designed multi-dimensioned histogram, based on compressed vector representations, enables efficient and high-resolution extraction of anomalies from the image. Current (un-optimized) implementation performs anomaly extraction in about 30 seconds for a 640-480 image using a 700 MHz PC.

This process proposes a fast and general technique for extracting anomalies in images. Anomaly detection can be approached in two ways. The first is contextual, where an anomaly is an unexpected event, given the high-level context of the scene. The second approach, which is the one used in the process, operates at a lower level by looking for unexpected local patterns in an image. The process characterizes anomalies using conditional probability densities. A region that is normal can be expected from its neighborhood, or is highly probable given its surrounding. In contrast, an area that is abnormal has little in common with its neighborhood, and its likelihood, conditioned on its neighborhood, should be relatively small.

Related work on texture synthesis and recognition has used joint probability distributions of local image frequency measures. The specific representations used include steerable pyramids, textons, and multi-resolution histograms. These representations, however, are not appropriate for anomaly detection. This is because the anomalies themselves serve to corrupt the representations used to recognize them. Another drawback is that these representations cannot adequately capture the joint probability distribution of an image region based on a neighborhood that has high frequencies.

Manduchi and Portilla proposed a novel representation based on Independent Component Analysis (ICA) for texture synthesis and clustering. ICA is used to ensure that the filters are statistically as independent as possible. This representation makes the calculation of region probabilities simple, but it shares the problems inherent to all frequency-based joint distributions; the lower frequencies may be influenced by portions of the image we seek to extract.

Finally, Efros and Leung proposed a texture synthesis method that computes the probability of a pixel value based on its surrounding. This approach works well but its computational cost is great, making it too slow for many real-world applications. Moreover, it is not suitable for our task as anomalies generally include more than a single pixel and have arbitrary shapes.

The Hionda and Nayar process proposes a method that detects anomalies in an arbitrary image. They calculate the probability of a region's occurrence, conditioned on its neighborhood. Several techniques and representations are used to make the algorithm efficient and robust. These include ICA for representing local regions, non-parametric correlation to suppress the effects of anomalies on our representations, the Discrete Cosine transform (DCT) and the Karhunen-Loeve transform (KLT) to represent neighborhoods, and multi-dimensional histograms for classification.

Figure 2:
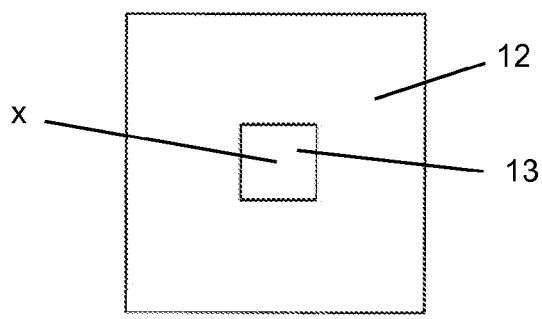
FIG. 2 shows an example or a sub-region within a neighborhood in the process of identifying an anomaly in the present invention.

An arbitrary image will include various patterns. Each small region 13 (sub-region) in the image bears a relationship to its immediate neighborhood 12. A vector composed of the brightness values within a sub-region centered at a point (x) (see FIG. 2) is denoted by an evaluation vector e(x). The vector representation of the surrounding brightness values is called the conditional vector and is denoted by $\omega(x)$. FIG. 2 shows the sub-region 13 within its neighborhood 12.

In computing the conditional probability, the likelihood of the evaluation sub-region at x is conditioned on the pattern surrounding it. The process uses a multi-dimensional histogram tree that can very efficiently find the set of vectors (for each image point) needed to compute the conditional probability. In general, it is not possible to calculate such a multi-dimensional histogram if k is large; a small increase in k causes rapid growth of the number of bins. This problem can be alleviated by using larger bins. However, a large bin size causes another problem; the histogram has large density errors at the borders of its bins. Low-pass filtering the calculated histogram can alleviate the problem. However, this is expensive in the case of a high-dimensional histogram of the type we are dealing with.

The process takes advantage of the fact that the total amount of data (corresponding to the number of pixels in an image) is really small compared to the number of bins in the histogram. The distribution of data is therefore very spare and hence all the data can be represented using a small part of the complete feature space. For this, the process uses a multi-way tree data structure that allows the process to reach every part of the multi-dimensional histogram using table references that are equal in number to the dimensions of the histogram.

In using the tree to find anomalies, the distribution of y is represented by a lattice whose sampling period is the same as the bin size. The conditioned distribution of y is calculated by interpolation using a low-pass filter that cuts frequencies whose period is shorter than the bin size multiplied by two. The optimal low-pass filter is the Sinc function; however this filter is known to sometimes produce ringing effects. The process therefore uses the Lanczos filter that has similar characteristics as the Sinc function but is more robust to the ringing problem.

In eliminating the effects of anomalies on the tree, a very simple but effective method is used to minimize the effects. The tree is constructed using all the information in the image and hence includes the contributions of anomalies as well. However, the effects of anomalies can be reduced during the final stage of evaluating sub-regions in the image. In the case of each sub-region, it is hypothesized that it may include an anomaly region. If this is the case, it is safe to assume that its immediate neighborhood is also corrupted by the same anomaly. Hence, the contributions of all the evaluation sub-regions that are in the immediate neighborhood of the present evaluation sub-region are subtracted from the tree. Then, the evaluation sub-region is classified using the tree. Once this is done, the subtracted contributions are added back into the tree and the process is repeated for the next evaluation sub-region. This simple step adds significant robustness to the extraction algorithm.

The Honda and Nayar process is a general method for extracting anomalies from an arbitrary image. By using the probability density for sub-regions in an image conditioned upon their surrounding, the developed algorithm can recognize irregular parts of a complex image. The algorithm employs linear estimation, Independent Component Analysis (ICA) and Karhunen Loeve Transformation (KLT) for quick and compact representations of image data. A carefully designed multi-dimensional histogram tree enables efficient and high-resolution extraction of anomalies from the image. The proposed algorithm has potential uses in a variety of application domains, ranging from unsupervised visual inspection to interactive image editing.

Figure 3:
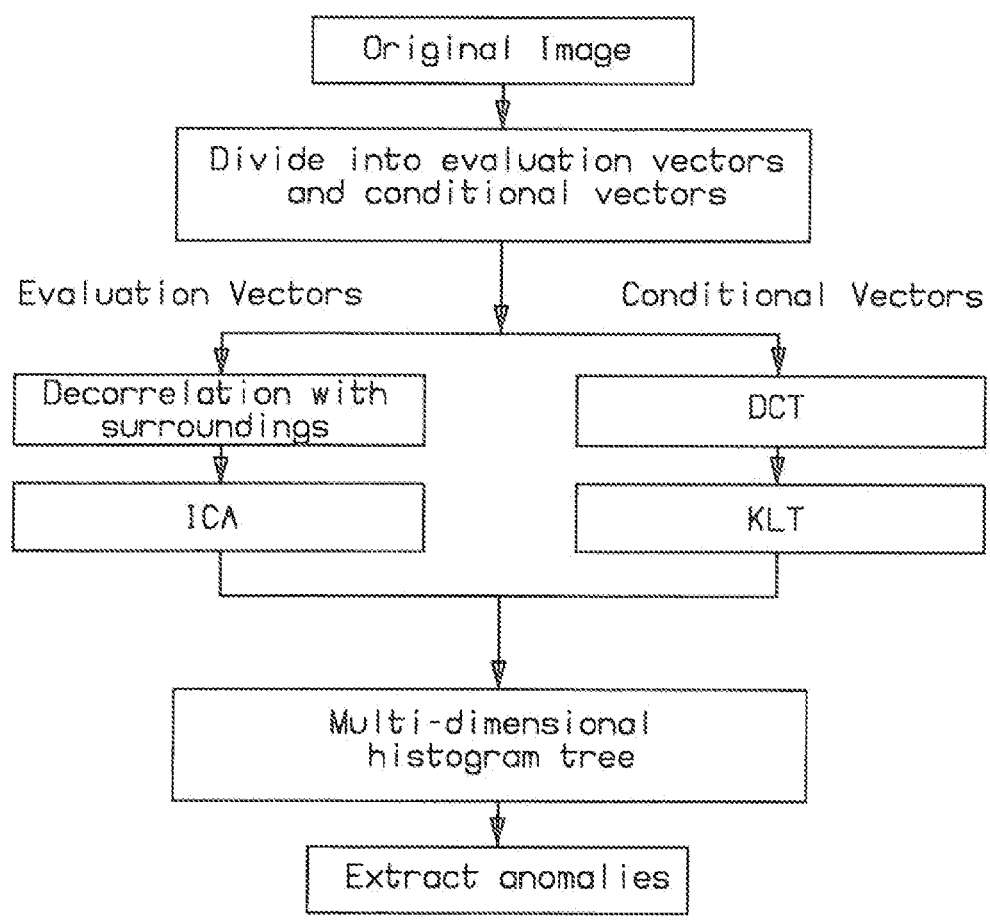
FIG. 3 shows a flow chart of an anomaly extraction algorithm used in the process of the present invention.

FIG. 3 shows a complete flow diagram for the anomaly extraction algorithm of the process. This includes producing an original image. Then, divide into evaluation vectors e(x) and conditional vectors ω(x) that are split up in the process. The evaluation vectors e(x) are then pass through a decorrelation step with the surroundings using the ICA while the conditional vectors ω(x) pass through the DCT and the KLT transforms. The two merge into the multi-dimensional histogram tree. Then, the anomalies are extracted from the histogram tree.

Figure 4:
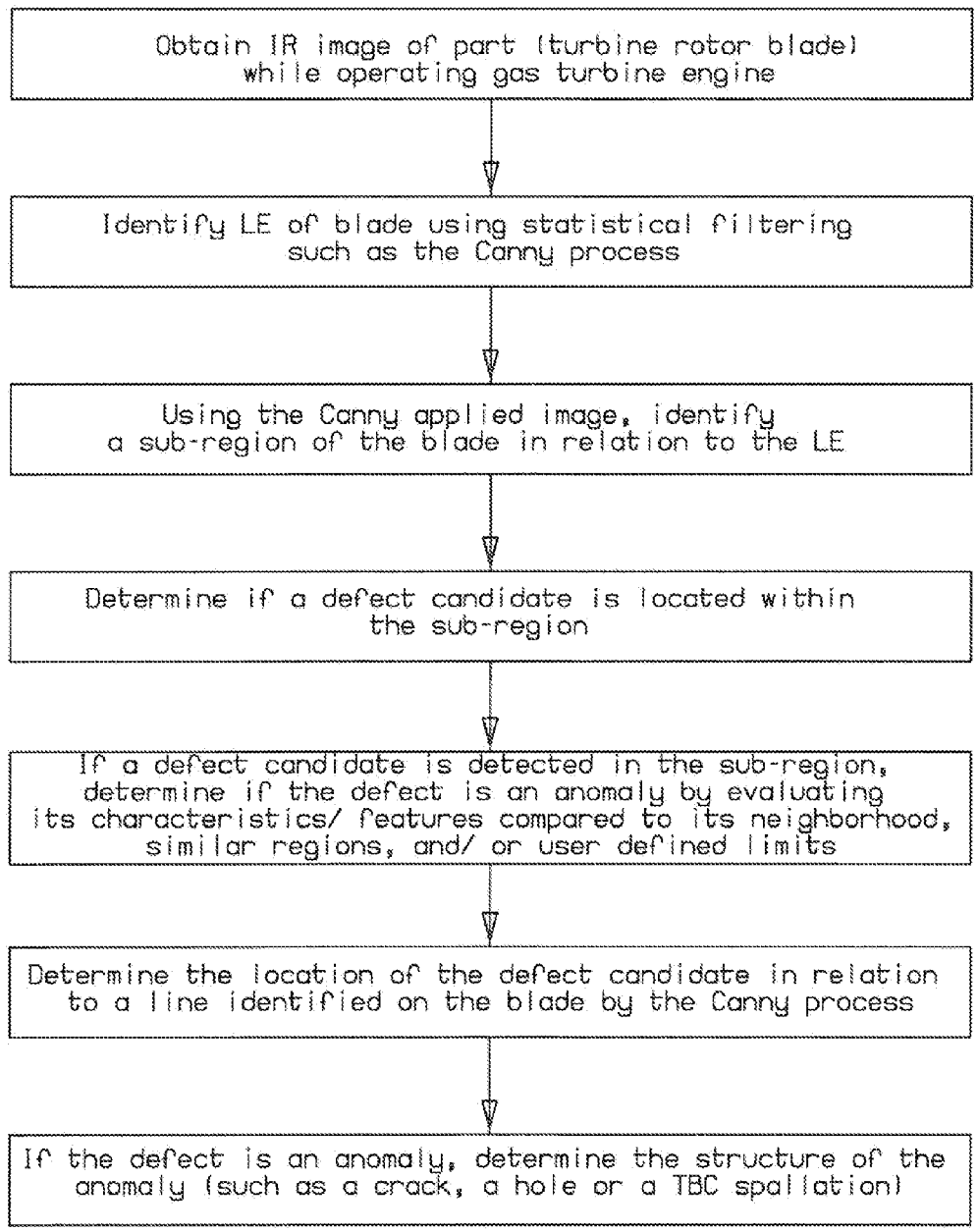
FIG. 4 shows a flow chart of the process for identifying an anomaly such as a crack on a turbine blade of the present invention.

FIG. 4 shows a flow chart of the steps used in the method of the present invention for identifying a defect such as a crack on a turbine rotor blade while the blade is in operation with an engine. For the present invention of detecting a defect such as a crack on a rotating turbine blade in operation within a gas turbine engine, given infrared (IR) radiometric image data of a turbine blade in a rotating environment, the leading edge can be found using statistical filtering. This statistical filter finds the mean and standard deviation of the data in the image matrix. A statistical image can be created and subtracted from the original image. The location of the leading edge can be found from the newly subtracted image by applying an averaging algorithm. The Canny edge detection algorithm can be applied to the original image and a new image of edges can be generated. Using the image of edges, with knowledge of the leading edge location, an algorithm scans the entire image for possible defects. If a possible defect candidate is found, its size, magnitude, pixel location and location compared to the leading edge are collected. After all the possible defects are located, an algorithm determines, either statistically or with user defined limits, if the possible defect candidate is anomalous to the system/image. Determining if the defect candidate is statistically anomalous requires the analysis of the pixel values around the defect called 'the neighborhood'. The Honda and Nayar process for finding anomalies in an arbitrary image is used for this. Based on the neighborhood's characteristics compared to the entire image and compared to the defect, the likelihood of the defect can be calculated. If a defect is statistically not likely to occur, it is considered anomalous. A diagnostic state can be determined based on the infrared/temperature profile, combined with data of anomalies.

The defects that can be imaged by the process include cracks, holes or spallation of TBC from the blade surfaces. The IR camera is typically angled at the rotating blade with a view of the leading edge of the blade or the platform or an intersection of the airfoil and the platform. These locations are the high stress locations where defects are most likely to be formed. A software program is used to time the rotation of each blade so that the IR camera can image a desired blade. A lead or lag time can be used to image a different blade from the main blade in which the timing is set.

I claim the following:

1. A method for identifying a defect on a turbine rotor blade of a gas turbine engine, the method comprising the steps of:
    operating the turbine rotor blade within the gas turbine engine in which the turbine rotor blade is exposed to a hot gas stream;
    identify a line of the turbine rotor blade;
    scan a section of the turbine rotor blade with an IR camera;
    identify a sub-region of the turbine rotor blade located a distance from a leading edge of the blade;
    determine if a defect candidate is located within the sub-region of the turbine rotor blade;
    if a defect candidate is located within the sub-region of the blade, determine if the defect candidate is an anomaly;
    determine a location of the defect candidate in relation to the identified line of the blade; and,
    if the defect candidate is an anomaly, determine a structure of the anomaly.

2. The method for identifying a defect on a turbine rotor blade of claim 1, and further comprising the step of:
    the step of identifying a line of the turbine rotor blade includes identifying a leading edge of the blade.

3. The method for identifying a defect on a turbine rotor blade of claim 1, and further comprising the step of:
    the step of identifying a line of the turbine rotor blade includes identifying a line between a platform and an airfoil of the blade.

4. The method for identifying a defect on a turbine rotor blade of claim 1, and further comprising the step of:
    the step of identifying a line of the blade includes using a statistical filtering process.

5. The method for identifying a defect on a turbine rotor blade of claim 4, and further comprising the step of:
    the statistical filtering process is a Canny process.

6. The method for identifying a defect on a turbine rotor blade of claim 1, and further comprising the step of:
    the step of identifying for an anomaly includes comparing a sub-region of the blade with its surrounding neighborhood.

7. The method for identifying a defect on a turbine rotor blade of claim 6, and further comprising the step of:
    the step of identifying for an anomaly includes computing a probability density for a sub-region in an image using linear estimation and Independent Component Analysis in combination to obtain a probability estimate.

8. The method for identifying a defect on a turbine rotor blade of claim 7, and further comprising the step of:
   the step of identifying for an anomaly includes Karhunen Loeve Transform for quick and compact representation of image data.

9. The method for identifying a defect on a turbine rotor blade of claim 6, and further comprising the step of:
   the step of identifying for an anomaly includes using a multi-dimensional histogram tree in order to enable efficient and high-resolution extraction of an anomaly from the image.

10. The method for identifying a defect on a turbine rotor blade of claim 6, and further comprising the step of:
    the step of identifying for an anomaly includes computing a probability density for sub-regions in an image conditioned upon areas surrounding the sub-regions.

11. The method for identifying a defect on a turbine rotor blade of claim 10, and further comprising the step of:
    the step of identifying for an anomaly includes combining linear estimation and Independent Component Analysis to obtain the probability estimates.

12. The method for identifying a defect on a turbine rotor blade of claim 11, and further comprising the step of:
    the step of identifying for an anomaly includes using a multi-dimensional histogram based on compressed vector representations to enable efficient and high-resolution extraction of anomalies from the image.

* * * * *